United States Patent [19]

LaPointe

[11] 4,334,408

[45] Jun. 15, 1982

[54] PNEUMATIC AND HYDRAULIC POWER CONTROL OF DRILL

[75] Inventor: Roland R. LaPointe, Claremont, N.H.

[73] Assignee: Joy Manufacturing Company, Pittsburgh, Pa.

[21] Appl. No.: 77,244

[22] Filed: Sep. 19, 1979

[51] Int. Cl.[3] .............................................. F16D 31/02

[52] U.S. Cl. ........................................ 60/423; 60/420; 60/431

[58] Field of Search ................. 60/419, 431, 423, 407, 60/420, 452; 417/46

[56] References Cited

U.S. PATENT DOCUMENTS

| | | | |
|---|---|---|---|
| Re. 28,717 | 2/1976 | Smith | 60/431 |
| 3,583,154 | 6/1971 | Utter | 60/431 |
| 3,890,360 | 6/1975 | Pruvot | 60/431 |
| 4,070,857 | 1/1978 | Wible | 60/431 |
| 4,118,149 | 10/1978 | Hagberg | 60/431 |
| 4,129,987 | 12/1978 | Blume | 60/452 |
| 4,168,612 | 9/1979 | Nikolaus | 60/431 |
| 4,199,942 | 4/1980 | Kasper | 60/452 |
| 4,209,988 | 7/1980 | Langworthy | 60/431 |

*Primary Examiner*—Abraham Hershkovitz

*Attorney, Agent, or Firm*—Raymond W. Augustin; Ernest E. Helms

[57] ABSTRACT

An apparatus and method of controlling the input power to a drill feed or other hydraulic system in which the hydraulic power source is obtained from a compressed air supply. Wherein, the flow of air is varied in response to a hydraulic signal controlled by the load demand of the hydraulic system. Low and high mode controls are provided to operate hydraulically actuated mechanisms; and a hydraulic absorbing load is imposed to prevent stall or overspeed of the pump and motor during low load conditions.

25 Claims, 1 Drawing Figure

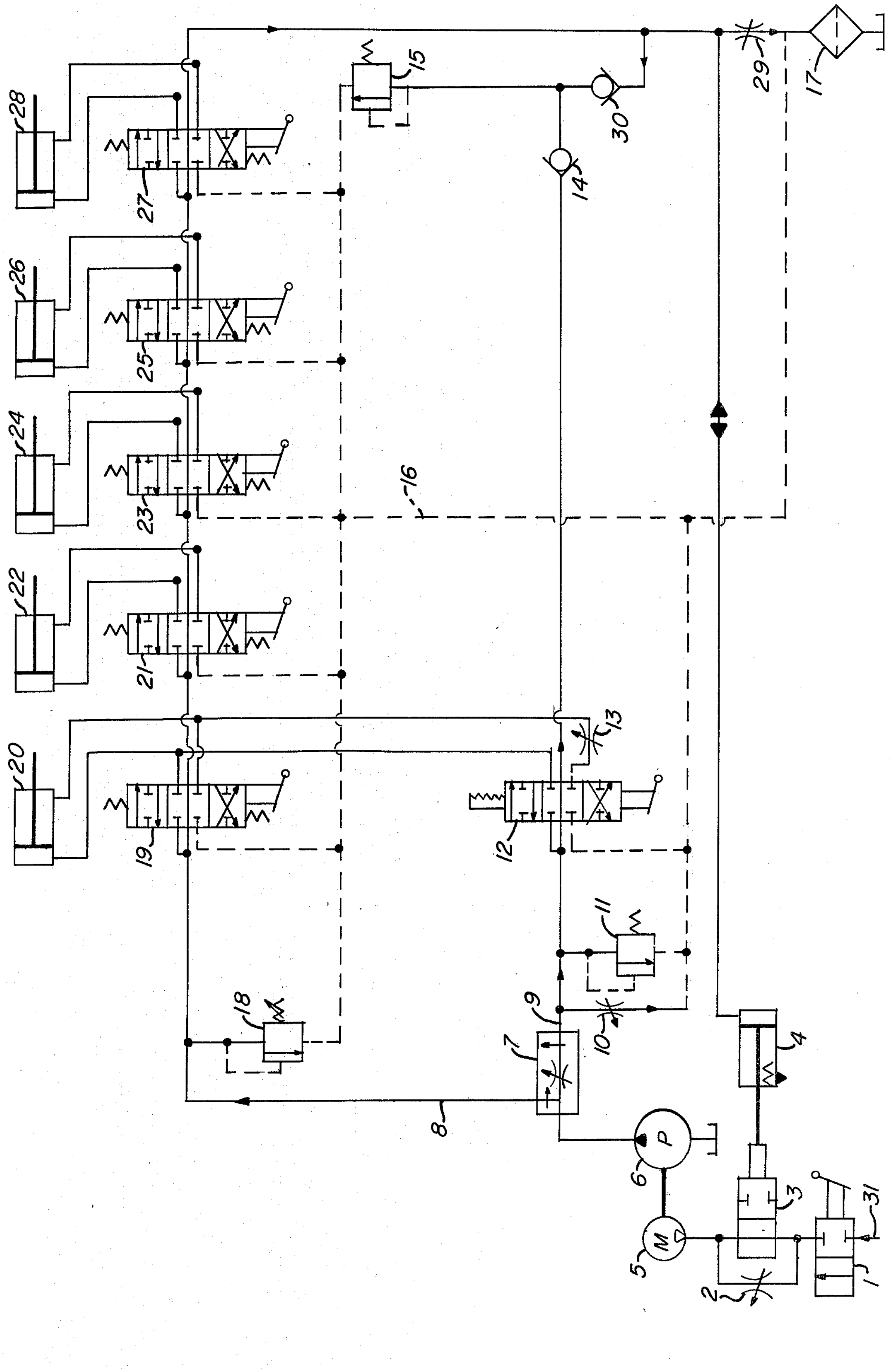
1
2
3
4
5
6
7
8
9
10
11
12
13
14
15
16
17
18
19
20
21
22
23
24
25
26
27
28
29
30
31
P
M

PNEUMATIC AND HYDRAULIC POWER CONTROL OF DRILL

BACKGROUND OF THE INVENTION

This invention relates to the control of a hydraulically actuated mechanism such as a drill feed mechanism in which the input power source is compressed gas. The power of the compressed gas is controlled and then converted into hydraulic power which is further controlled. Such control results in an efficient system for automatically regulating the hydraulic power available dependent upon the power demand of the load.

In previous air-powered hydraulically-actuated mine drills two hydraulic pumps, each driven by a radial piston air motor, were used. One such pump was used for low power operations and for example would be rated approximately four horsepower. The other pump would be used for higher power operations and would be for example rated at approximately ten horsepower. The prior system used air-stall closed-center hydraulic control which subjected the hydraulic pumps to extremely severe duty cycles. Frequently, operators failed to shut off the air supply to the air motors driving the pumps during no load conditions. Internal pump slippage occurred because of the continued attempt by the air motors to rotate the pump during stall. Since the pumps could not rotate because of the closed center hydraulic system, except for internal slippage, they overheated, reducing oil viscosity and increasing pump slippage still more. In addition, high operating temperature in mines coupled with improper viscosity oil caused pumps to fail frequently. Another consideration was the need for greater efficiency in the drilling cycle which represented 98% of the operating time, not counting drill rod changing time. The low power pump far exceeded the flow and power required for the drill feed part of the cycle; and the high power pump was used only during retraction when removing a rod from the drill string which represented 2% of the cycle. The open center hydraulic two pump hydraulic system often resulted in an inefficient, noisy operation suffering frequent downtime due to pump failure.

SUMMARY OF THE INVENTION

My invention overcomes the deficiencies of the previous systems by using a single air-driven hydraulic pump and by automatically varying the air input to the motor upon operation of the operator's controls. In addition I impose a light artificial hydraulic load on the system to prevent over speed of the air motor during periods where the actual drilling operations are not requiring hydraulic flow.

I provide for varying the air flow to the air motor to achieve low or high volume outputs. The change from low flow mode to high flow mode occurs automatically when the operator shifts any valve lever requiring a high mode operation. I provide a power beyond type of hydraulic control to supply a hydraulic signal to control the flow of air to the air motor. When this signal is interrupted, such as for example when the operators's valve diverts the hydraulic signal during initiation of a high mode operation, the air control increases the flow of air to the air motor.

It is an object of this invention to provide for an automatic reduction in the air flow during parts of the drilling cycle having low load requirements.

It is another object to prevent the hydraulic pump from stalling during no load conditions.

It is another object to provide an efficient system during both high and low load demands. it is another object to prevent over speed of the air motor during periods of low power requirements by the drilling operations.

It is another object to provide a low cost system having high reliability.

It is another object to protect the system from the operator's failure to shut off the air supply during no load parts of the drilling operation.

It is a further object to provide a system to readily shift from high to low inlet air pressure.

DESCRIPTION OF THE DRAWINGS

The drawing shows a hydraulic and pneumatic diagram of a presently preferred embodiment for a mobil mine drill having five hydraulically actuated cylinders in a parallel arrangement, with one of such cylinders operating in either a high or a low mode.

DESCRIPTION OF THE PRESENTLY PREFERRED EMBODIMENT

Referring to the drawing shows a source 31 of compressed gas, preferably compressed, air feeding a manually operated shut-off valve 1 which controls the air power available to the system. Air from the valve 1 is then fed through an adjustable restriction or low mode air valve 2 to the air motor 5. The air flow through valve 2 provides for the low mode operation of the motor 5. In parallel to the valve 2 is an air mode selector valve 3 which is hydraulically operated by means of the high-low mode cylinder 4. As shown in the diagram when valve 3 is in the high mode position, the air flow is shunted around the restriction valve 2 to the air motor 5. When a hydraulic signal operates cylinder 4, valve 3 is shifted to the closed or low mode position and the air flow is forced to pass through the restriction valve 2. As shown the cylinder 4 is spring loaded to maintain the high mode position when the pressurized hydraulic signal is not present. As can be seen from the diagram, valves 2, 3 and cylinder 4 are used to control and selectively reduce the flow of compressed air to the air motor 5. It is understood that the cylinder 4 can be operated to maintain the low mode position when the hydraulic signal is not present for applications requiring the low mode initially.

The air motor 5 is operably connected to a pump 6 to provide a source of pressurized hydraulic fluid generally related to the flow of the air to motor 5. The hydraulic fluid from pump 6 feeds the priority flow divider 7 which divides the flow into a generally fixed flow rate portion in line 9 and a remainder portion in excess line 8. The flow divider diverts a generally fixed rate of fluid to a priority subcircuit connected to priority line 9, allowing the remainder of the hydraulic flow to feed the pressure beyond subcircuit connected to line 8. For example in a mine drill system supplied by 250 psi, the pump delivers hydraulic fluid in the low mode at 2 gallon per minute at 300 pounds per square inch, and in the high mode at 12 gallon per minute and 2700 pounds per square inch. The priority divider 7 for example would supply 1 gallon per minute to both lines 8 and 9 in the low mode. In the high mode the divider 7 would supply 1 gallon per minute to line 9, and the remaining 11 gallons per minute to line 8.

A high pressure relief valve 18 protects the power beyond circuit from excessive pressure. In the given example valve 18 would be set at generally 2700 pounds per square inch. High pressure valves 19, 21, 23, 25 and 27 are respectively connected to double acting hydraulic cylinders 20, 22, 24, 26, 28. It is understood that other types of hydraulically actuated mechanisms can be used in place of these cylinders. In the present embodiment the high pressure valves are three position six connection valves having a center through position. Other diverting means are included within my invention, such as two position valves and parallel valve connections.

In the present embodiment shown in the diagram each of the high pressure valves 19, 21, 23, 25, 27 controls the operation and direction of the hydraulic flow from line 8 to the respective hydraulic cylinders 20, 22, 24, 26 on 28 which each requires a high mode flow of hydraulic fluid to properly operate. The center position on each of valves 19, 21, 23, 25 and 27 provides to feed through at least a signal portion of the hydraulic flow in line 8 to the cylinder 4. When any of the valves 19, 21, 23, 25 or 27 are operated the signal to cylinder 4 is interrupted causing the cylinder 4 to move to the high mode position.

When high flow is not required the valves 19, 21, 23, 25 and 27 are on the center position and the signal flow maintains cylinder 4 in a low mode position. After the cylinder 4 is positioned in the low mode, the signal flow is through check valve 30 to relief valve 15. Relief valve 15 acts as an artificial load by absorbing hydraulic pressure at a preset pressure such as for example 300 pounds per square inch. In a steady state low mode position relief valve 15 would absorb 1 gpm from the remainder or excess portion through check valve 30, and 1 gpm from the fixed flow rate portion through check valve 14. Relief valve 15 imposes a hydraulic load to prevent stall of the pump 6 and overspeed of the air motor 5.

The rate of change from the low to high mode is adjustable by means of adjustable needle valve 29 which returns fluid from the pressure beyond circuit to the reservoir and filter arrangement 17. Drain line 16 from the valves 19, 21, 23, 25, 27 and the load relief valve 15, also return hydraulic fluid to the reservoir 17.

The fixed flow rate portion from the divider 7 feeds the low mode control valve 12, the adjustable needle valve 10, and the over pressure valve 11. The valve 11 is used to protect the priority subcircuit fed by line 9. In the previous example valve 11 would be adjusted to generally 1000 pounds per square inch. Valve 12 is a three position valve used to supply a hydraulically actuated mechanism at a low mode flow rate. In the embodiment shown in the diagram this low mode mechanism is the same as that operated by one of the high mode valve, namely cylinder 20. The low mode control valve 12 can be used to operate any mechanism including those operated by any or all of the valves 19, 21, 23, 25, 27 or independent mechanism.

Adjustable needle valves 10 and 13 are used to adjust the flow rates and pressure exerted by cylinder 20, in each direction of the low mode operation.

When the system shown in the diagram is used in a preferred embodiment to control a mobile mine drill a hydraulic actuated mechanism or cylinder 20 is used to operate the drill feed/retract function and cooperates with a sprocket and chain or other mechanical linkage to feed or retract the drill. As shown in the diagram when the piston associated with cylinder 20 moves to the right, as shown, the drill feeds; and when the piston moves to the left, as shown, the drill retracts. In such embodiment the valve 12 controls the low mode, or slow feed and retract. Operation of valve 19 automatically interrupts the flow of fluid from line 8 to cylinder 4, and causes the valve 3 to shift to the high mode for fast retract or fast feed operation depending upon the direction of the repositioning of valve 19. When valves 19, 21, 23, 25, 27 and low mode valve 12 are centered, no fluid is diverted to any of the cylinders 20, 22, 24, 26, 28 and a load is imposed on the pump 6 by the flow of pressurized hydraulic fluid through relief valve 15.

When the embodiment shown in the diagram is used in a vertical mine drill needle valves 10 and 13 are used to independently adjust the slow feed and retract rates to compensate for the gravity load of the drill string and boom.

In a vertical down drilling operation, needle valve 10 enables the operator to control the down feed rate and pressure of the drill string from the surface down. The needle valve 13 allows the operator to hold back the drill string when drilling downward by controlling the discharge of the cylinder during the feed operation.

It will therefore, be appreciated that the present invention provides an economical means for controlling a drill which requires low power during most of the cycle and high power during only a small portion of the cycle. This is accomplished automatically with a minimum number of component parts and at a minimum cost so as to function as a highly reliable varying power system.

Whereas some presently preferred embodiments of the invention have been described above for purposes of illustration, it will be evident to those skilled in the art that other various embodiments are within the scope of the following claims.

What is claimed is:

1. An apparatus for the operation of a mechanism having varying power requirements comprising:
   - means for providing a source of pressurized gas having control means for selectively varying the flow of the gas over a predetermined range in response to a pressurized hydraulic fluid;
   - pump means operably connected to the output of said control means for providing a source of pressurized hydraulic fluid generally responsive to the flow of the varying gas flow from said control means;
   - at least one hydraulically actuated mechanism means for translating hydraulic energy into mechanical energy;
   - at least one valve means for alternatively selectively communicating at least a portion of the pressurized hydraulic source to said mechanism means or to said control means as a hydraulic signal such that said control means reduces the flow of the gas when said valve means is not placing the hydraulic source in communication with said mechanism means.

2. The apparatus of claim 1 further including:
   - load means for imposing a predetermined load on said pump means by absorbing at least a portion of the hydraulic flow from said pump means at a predetermined pressure.

3. The apparatus of claim 2 wherein said load means absorbs at least a portion of the hydraulic signal.

4. The apparatus of claim 1 further comprising:
   - pressure reducing means for deriving a low pressure source of hydraulic fluid from said hydraulic source; and low pressure valve means for selectively diverting at least a portion of fluid from said low pressure source to at least one of said hydraulically actuated mechanism means.

5. The apparatus of claim 4 wherein said valve means and said low pressure valve means selectively divert hydraulic fluid to the same of said hydraulically actuated mechanism means.

6. The apparatus of claim 4 further including load means for imposing a predetermined load on said pump means by absorbing at least a portion of the hydraulic fluid from said pump means at a predetermined pressure.

7. The apparatus of claim 6 wherein said load means absorbs at least a portion of the hydraulic signal.

8. The apparatus of claim 7 wherein said load means absorbs at least a portion of the hydraulic flow from said low pressure source.

9. The apparatus of claim 8 further including:

flow divider means for dividing the flow of hydraulic fluid from said source into a generally fixed flow rate portion communicating with said low pressure valve means and a remainder portion in fluid communication with said valve means;

said valve means including at least one manually operated multi-position hydraulic valve having a first position selectively communicating said remainder portion to at least one of said mechanism means and a second position selectively communicating said remainder portion to said control means;

said low pressure valve means includes at least one manually operated multi-position hydraulic valve having a first position selectively communicating at least a portion of said fixed rate portion to at least one of said mechanism means and a second position selectively communicating at least a portion of said fixed rate portion to said load means; and said load means includes a hydraulic pressure relief valve.

10. The apparatus of claim 8 wherein the rate of change of said control means is adjustable.

11. The apparatus of claim 8 wherein said rate of change is adjustable by means of a hydraulic bleeder valve in fluid communication with said hydraulic signal.

12. The apparatus of claim 8 wherein said low pressure valve means includes:

means for reversing the direction of flow of such hydraulic fluid to said mechanism means; and means for independently controlling the flow rate of such hydraulic fluid to or from said mechanism means.

13. The apparatus of claim 1 further comprising:

flow divider means for dividing the flow of hydraulic fluid from said pump means into a generally fixed flow rate portion and a remainder portion in fluid communication with said valve means; and low pressure valve means for selectively directing at least a portion of said fixed flow portion to at least one of said hydraulically actuated mechanism means.

14. The apparatus of claim 13 further comprising:

load means for imposing a predetermined load on said pump means by absorbing at least a portion of said fixed flow rate portion.

15. The apparatus of claim 13 further comprising load means for imposing a predetermined load on said pump means by absorbing at least portions of said fixed flow rate portion and said remainder portion.

16. In a mobile drill used for boring holes in rock and earth having a plurality of hydraulically actuated mechanisms for performing drilling functions and having a source of pressurized gas a power control apparatus comprising:

control means for selectively varying the pressure of such gas over a predetermined range in response to a pressurized hydraulic fluid;

pump means operably connected to the output of said control means for providing a source of pressurized hydraulic fluid generally responsive to the varying gas flow from said control means; and at least one valve means for alternatively selectively communicating at least a portion of the pressurized hydraulic source to one of such mechanisms or to said control means as a hydraulic signal such that said control means reduces the flow of the gas when said valve means is not placing said hydraulic source in communication with said one mechanism.

17. The apparatus of claim 16 further comprising:

load means for imposing a predetermined load on said pump means by absorbing at least a portion of the hydraulic flow from said pump means at a predetermined pressure.

18. The apparatus of claim 17 further comprising:

flow divider means for dividing the flow of hydraulic fluid from said pump means into a generally fixed flow rate portion and a remainder portion in fluid communication with said valve means; and low pressure valve means for selectively diverting at least a portion of said fixed flow portion to at least one of such hydraulically actuated mechanisms.

19. The apparatus of claim 18 wherein said valve means and said low pressure valve means selectively divert hydraulic fluid to the same of such hydraulically actuated mechanisms; and said same mechanism is operably connected to such drill to selectively feed or retract such drill.

20. The apparatus of claim 19 wherein said low pressure valve means includes:

means for reversing the direction of flow of the hydraulic fluid to said same mechanism; and means for independently controlling the flow rate of such hydraulic fluid to or from said same mechanism.

21. The apparatus of claim 20 wherein the flow of the hydraulic fluid diverted to said same mechanism by said low pressure valve means is less when such drill is being fed than when said drill is being retracted.

22. The apparatus of claim 21 wherein said load means absorbs at least portions of said fixed flow portion and said remainder portion; and the rate of change of said air control means is adjustable.

23. The apparatus of claim 22 wherein:

said valve means includes at least one manually operated multi-position hydraulic valve having a first position selectively communicating said remainder portion to said same mechanism and a second position selectively communicating said remainder portion to said control means;

said low pressure valve means includes at least one manually operated multi-position hydraulic valve having a first position selectively communicating at least a portion of said fixed rate portion to said same mechanism and a second position selectively communicating at least a portion of said fixed rate portion to said load means; and said load means includes a hydraulic pressure relief valve.

24. A method of operating a mobil drill comprising:

supplying a source of pressurized gas to such drill;

varying the flow of such pressurized gas in response to a hydraulic signal;

converting the varying flow of said pressurized gas into a hydraulic fluid flow generally varying in response to such varying gas flow;

dividing such hydraulic flow into a generally fixed flow rate portion and a remainder portion;

selectively alternatively diverting at least a portion of said remainder portion to actuate the feeding and retracting movements of such drill or to provide a hydraulic fluid signal to initiate the varying of the flow of said gas;

imposing a load on the hydraulic flow by absorbing at least a portion of the flow of said remainder portion at a predetermined pressure;

selectively alternatively diverting at least a portion of such fixed flow rate portion to actuate the feeding and retarding movements of such drill or to impose a load on the hydraulic flow by absorbing at least a portion of such fixed flow rate at a predetermined pressure.

25. The method of claim 24 further including:

controlling the rate of change of pressure of such signal;

selectively reversing the direction of flow of said remainder portion to control the direction of movement of such drill feed; and selectively reversing the direction of flow of said fixed flow rate portion to control the direction of movement of such drill feed while independently controlling the flow rate of such portion of such fixed flow rate portion to or from said drill feed.

* * * * *